Aug. 7, 1951 G. D. MYLCHREEST 2,563,130
APPARATUS FOR TEMPERING GLASSWARE
Filed Nov. 30, 1948
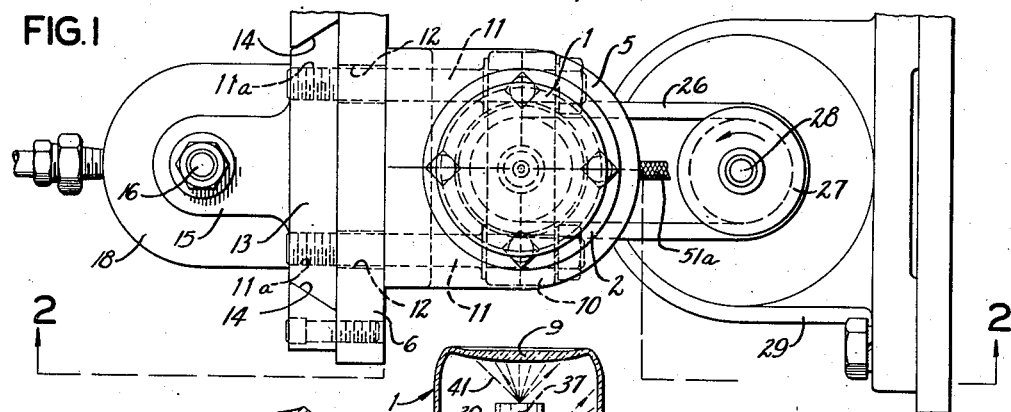
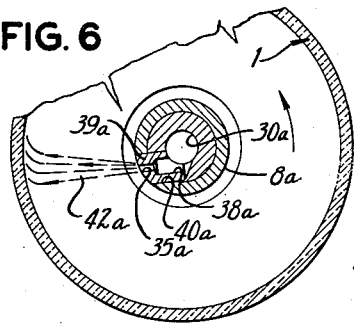
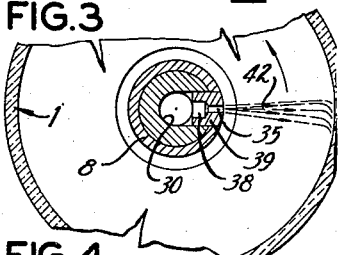
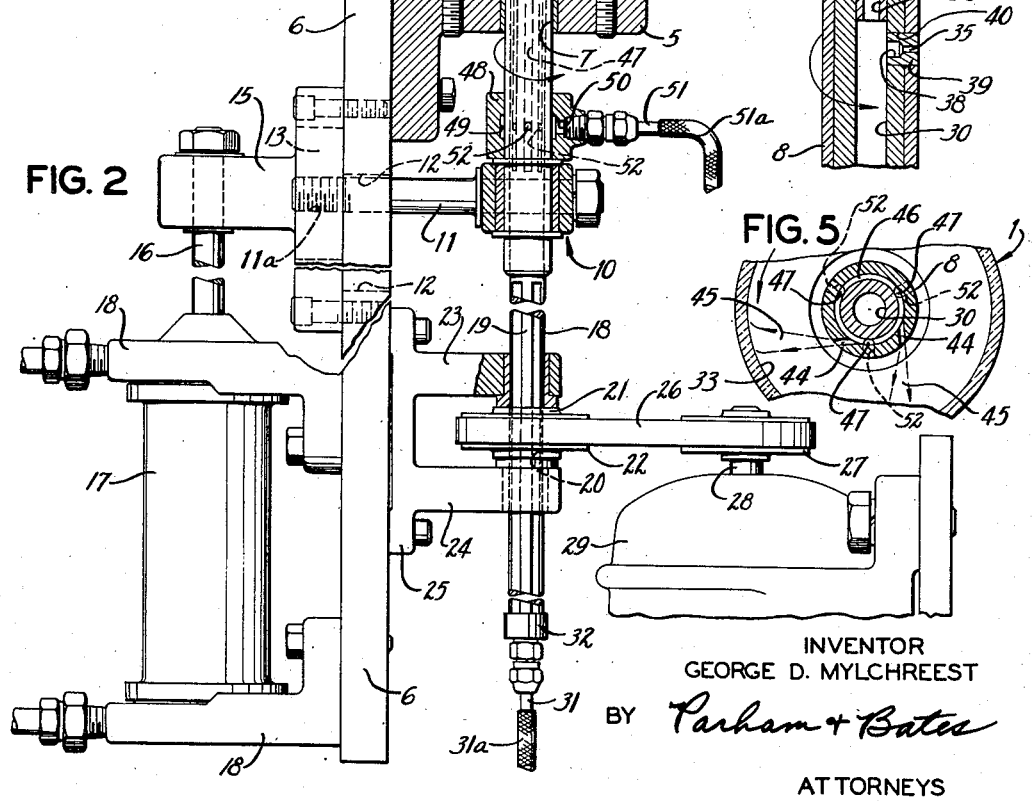
INVENTOR
GEORGE D. MYLCHREEST
BY Parham + Bates
ATTORNEYS Patented Aug. 7, 1951

2,563,130

UNITED STATES PATENT OFFICE 2,563,130

APPARATUS FOR TEMPERING GLASSWARE

George D. Mylchreest, Wethersfield, Conn., assignor to Emhart Manufacturing Company, a corporation of Delaware Application November 30, 1948, Serial No. 62,707

4 Claims. (Cl. 49—45)

This invention relates to improvements in apparatus for tempering glassware, such as bottles, jars and the like and more particularly for the tempering of shouldered glass articles, i. e., those which have smaller open end or neck finish portions joined to larger diameter body portions by more or less abruptly enlarging shoulder portions. The invention further has more particular relation to the tempering of such shouldered articles of glassware by use of a coolant which includes a liquid, which may be water, discharged from an internal nozzle against the internal surface of such an article while the latter is at a suitably high temperature.

Tempering of glassware is effected by rapidly chilling the surface thereof when the glassware has been heated to a temperature above the strain point of the glass, preferably near its softening point, to a temperature below such strain point. In order to obtain a more abrupt and vigorous chilling action on the hot glass surface than can be obtained by the use of air or other gas alone, it has been proposed to subject the hot glass surface to jets of air and liquid, directed thereagainst in the form of a spray. To chill the internal surface of a bottle, jar or the like, it is necessary or desirable to insert a nozzle into the glass article axially thereof and to discharge jets of coolant from numerous jet holes in the wall of the inserted portion of the nozzle against the internal bottom and side walls of the article. To obtain desirable uniformity of the chilling action through the entire area of such internal bottom and side walls of the article, relative rotation between the nozzle and the article may be employed, as by rotating the nozzle about its axis.

A difficulty encountered in attempts to chill the internal surface of the hot glass article by jets of coolant containing the liquid when such an article is upright is that accumulation of liquid in the bottom of the article may check or injure the glass bottom wall of the article and otherwise impair the tempering result. To overcome this objection, it has been proposed to invert the article so that the tempering nozzle projects thereinto from below so that unvaporized liquid will drain by gravity down the wall of the inverted article to and from the open lower end thereof. However, attempts to obtain satisfactory tempering of shouldered glass articles in this manner have the shortcoming that liquid will accumulate in a series of drops or in a continuous ring on the inner surface of the inverted article at the shoulder thereof and, because of the angular velocity imparted thereto by the rotation of the nozzle, will continue to whirl around on the internal surface of the shouldered portion of the article until the angular velocity thereof has been sufficiently reduced to permit the liquid to drain out of the article by gravity. This may be too late to prevent injury to the glass or impairment of the tempering operation.

An object of the present invention is to obviate or overcome the difficulty just mentioned in the tempering of inverted shouldered glass articles by the use of a coolant having a liquid component.

One way to do this according to the present invention is to avoid creating the undesirable angular velocity of the liquid discharged onto the internal surface of the glass article. Thus, the jet holes in the rotating nozzle may be formed to discharge jets of spray in a direction sufficiently counter to the direction of rotation of the nozzle to neutralize the angular velocity-creating action of the latter. Another way to carry out the invention is promptly to destroy any angular velocity of drops or a ring of liquid on the internal surface of the shouldered portion of such an article. This may be done by directing non-radial jets of a suitable fluid, such as air, from the nozzle obliquely against the internal surface of the shouldered portion of the article so as to break up any incipient accumulation of liquid there by opposing any angular motion thereof created by the rotation of the nozzle. These corrective counter-rotational jets of air may be provided in addition to counter-rotational jets of air-liquid spray so as to supplement the latter both as to cooling effect on the glass and as a preventive of injury to the glass by reason of angular velocity of liquid from the spray thereon. When these corrective counter-rotational jets of air are relied on alone to prevent such injury, the air-water jet holes may be provided in the nozzle for their glass chilling effect without consideration being given to the matter of angular velocity of the cooling jets of spray discharged therefrom. When counter-rotational air-water jets alone are relied on to prevent such injury, some of these may be provided in the nozzle in positions operatively related to the shouldered portions of the glass articles to be tempered.

Other objects and advantages of the invention hereinafter will be pointed out or will become obvious from the following description of illustrative embodiments of the invention as shown in the accompanying drawings, in which Fig. 1 is a plan view of apparatus for carrying out the invention;

Fig. 2 is a view partly in side elevation and partly in vertical section, as along the line 2—2 of Fig. 1, of the illustrative apparatus;

Fig. 3 is a relatively enlarged partial horizontal section along the line 3—3 of Fig. 2;

Fig. 4 is a fragmentary vertical section of the upper end portion of the nozzle;

Fig. 5 is a partial horizontal section in relatively enlarged form along the line 5—5 of Fig. 2; and Fig. 6 is a view like Fig. 3 but showing a nozzle having non-radial jet or discharge outlets for the cooling spray.

To temper an article of glassware, such as the bottle indicated at 1 in Figs. 2, 3, 5 and 6, apparatus embodying the invention may include a stationary article rest plate 2, Fig. 2, on which the bottle may stand in inverted position so that the opening 3 in the lower end or neck finish portion of the inverted article is aligned with an opening 4 in the rest plate. As shown, the rest plate is carried by a bracket 5 on a supporting upright 6, this bracket having a bushed opening 7 in alignment with the opening 4 in the rest plate. This structural arrangement permits a nozzle 8 to be inserted from below the bracket 5 upwardly into the inverted bottle axially of the latter until the upper end of the nozzle is at the desired level in the bottle, as near but below the bottom 9 of the bottle. The bottle may be restrained against lateral shifting movement on the plate 2 by retaining lugs 2a thereon.

To project the nozzle from a lower retracted position upwardly to its active position in the bottle as shown in Fig. 2 for a tempering operation and thereafter to retract the nozzle to permit convenient removal of the bottle, any suitable nozzle supporting and operating mechanism may be employed. As shown, the nozzle is rotatably carried by a collar type holder 10 having a pair of horizontally spaced parallel studs 11 extending laterally therefrom through vertical slots 12 in the upright 6 and attached to a vertically movable slide block 13 which is mounted in a vertical guideway 14 on the upright 6. The attachment of the studs 11 to the block 13 in the example shown is by threaded engagement of end portions of these studs at 11a with threaded openings in the block. The block 13 has a laterally projecting ear 15 secured on the upper end of a vertical piston rod 16 which projects from the upper end of an air motor 17 mounted on a bracket 18 on the upright support 6. Operation of the air motor 17 in a conventional manner will reciprocate the nozzle 8 vertically and the amplitude of this reciprocation may be predetermined to position the nozzle in its active position as shown in Fig. 2 when the piston rod 16 is at the upper end of its stroke and to retract the nozzle downwardly from the bottle to a sufficiently low level to permit removal of the bottle from the rest plate when the piston rod 16 is at the lower limit of its stroke. The bottle, heated to the temperature desired, may have been placed on the rest plate 2 in any suitable known way.

Any suitable mechanism may be employed to rotate the nozzle about its axis. As shown, the nozzle has a downward stem portion 18 provided with a longitudinal spline 19 slideable in a longitudinal guideway 20 in a hub 21 of a pulley 22 which is mounted in a horizontal position between the vertically spaced arms 23 and 24, respectively, of a bracket 25 on the upright support 6, the pulley being rotatable about its axis to rotate the nozzle. A belt 26 is trained about the pulley 22 and a drive pulley 27 on a drive shaft 28 of a suitably located motor unit 29.

The structural arrangement just described obviously permits vertical reciprocation of the nozzle and rotation thereof about its vertical axis at any and all positions thereof.

The nozzle is provided with a central cooling fluid passage 30 extending axially thereof and connected at the lower end of the nozzle stem with a cooling fluid supply line 31. This line may include a flexible section, generally indicated at 31a, to permit reciprocatory movements of the nozzle. To permit rotation of the nozzle independently of its fluid supply line, the connection between these parts may be effected by a suitable swivel coupling or connection, indicated at 32, which may be of any suitable known or preferred construction. The cooling fluid introduced into the central passage 30 from the supply line 31 may be air carrying with it an atomized liquid, such as water. For discharge of cooling air-water spray from the nozzle against the bottom and internal side wall of the bottle 1 above the region, designated 33 in Figs. 2 and 5, where the side wall tapers or curves inwardly to an extent sufficient to provide some undersupport for liquid thereon, the nozzle is formed with bottom and lateral jet holes, respectively designated 34 and 35. As shown in Fig. 4, the bottom jet hole 34 may be a relatively reduced outer end portion of the bore 36 of a tubular plug 37 secured in the upper end of the axially extending bore or central passage 30 of the nozzle. Fig. 4 also shows a lateral jet hole 35 as being the relatively reduced outer end portion of a bore 38 of a similar plug, designated 39, secured in a suitably drilled opening 40 in a side wall of the nozzle. The number of the lateral jet holes 35, the relative locations thereof both longitudinally and circumferentially of the nozzle, may be selected as deemed best to meet existing service conditions. Fig. 2 shows two of the lateral jet hole plugs 39 at one side of the nozzle body at different levels, but obviously a greater number of these plugs may be employed and they may be placed at a number of circumferentially spaced points around the nozzle. Also, the effective cross-sectional areas of the individual jet holes may be predetermined and selected to be most suitable for their individual service requirements. Instead of providing inserted plugs containing the jet holes, these may be provided in any other known manner, as by direct drilling of the wall of the nozzle.

As shown in Fig. 2, an expanding or cone shaped body of spray 41 is discharged from the bottom jet hole 34 upwardly against the internal surface of the bottom of the inverted bottle while similarly shaped bodies of spray, designated 42, are being directed laterally from the lateral jet holes 35 against the inner surface of the side wall of the bottle above the level of the region 33, the latter extending around the inner surface of the shouldered or downwardly tapered portion 43 of the bottle. The jet holes may have been provided in the nozzle without regard to the effect of the relative rotation between the nozzle and the bottle on the liquid components of the spray reaching the inner surface of the bottle wall. As hereinbefore has been pointed out, such spray has an appreciable angular velocity in the direction of rotation of the nozzle, which is indicated by direction arrows to be counterclockwise in the example shown. Thus, the lateral jet holes 35 may extend radially through the nozzle wall but the rotation of the nozzle will tend to throw the spray discharging therefrom in a direction having a counterclockwise angular component and considerable angular velocity. Drops or a ring of liquid from the spray arriving on the internal surface of the shouldered portion 43 of the bottle in the region 33 thus will continue to whirl around until the angular velocity thereof is sufficiently reduced to permit downward gravity drainage thereof through the open end of the bottle.

In carrying out the invention by use of the nozzle shown in Figs. 2 to 5, inclusive, the counterclockwise angular velocity of liquid on the inner surface of the bottle wall in the region 33 is opposed by jets of air from suitably located lateral jet holes 44. These discharge jets of air 45 against such surface in a direction counter to the direction of rotation of the nozzle. The effect of these air jets 45 is to stop any whirling action of moisture on the inner surface of the shouldered portion of the bottle in the direction of rotation of the nozzle, so that such moisture will drain by gravity from the inverted bottle without being permitted to remain in contact with this surface of the glass long enough to cause checking or other injury of the glass. As shown in Fig. 5, the jet holes 44 are non-radial holes extending obliquely in the wall of the nozzle 8 to the exterior thereof from an annular passage 46 in such wall, the outer ends of such jet holes being turned counter to the direction of rotation of the nozzle. Two of the non-radial jet holes 44 are shown, but a greater number thereof may be provided if desired. The annular passage 46 is supplied with air under pressure by vertical passages 47 in the wall of the nozzle 8. These vertical passages lead downwardly in such nozzle wall to a short non-rotary air-intake sleeve or collar 48 which is mounted on the nozzle 8 for vertical movements therewith, as on the portion thereof directly above the holder 19, and in which the nozzle may rotate about its axis. The sleeve or collar 48 is provided with an internal annular air supply passage 49 supplied with air under pressure through a port 50 from a supply line 51 and communicating with the vertical passages 47 through radial ports 52 in the nozzle wall. The supply line 51 may include a flexible section 51a to provide for vertical movements of the nozzle-connected portion thereof.

As hereinbefore stated, the invention may provide and make use of a nozzle having air-liquid discharge outlets or jet holes to apply a counter-rotational force to the spray reaching the inner surface of the bottle wall to obviate the undesirable angular velocity of the liquid component of such spray. A nozzle, designated 8a, of this description is partially shown in Fig. 6 in working position in the bottle 1, the view showing one of the lateral air-liquid discharge outlets or jet holes, designated 35a, of such nozzle. This is shown as a restricted outer end portion of a bore 38a of a nipple or tubular plug 39a secured in a drilled non-radial, obliquely extending opening 40a in the wall of the nozzle so that air-liquid coolant supplied by a central bore 30a of the nozzle is discharged from the jet hole 35a as spray 42a having a sufficient force counter to that resulting from the rotation of the nozzle to nullify or substantially nullify the effect of the latter so far as creation of angular velocity of liquid from the spray reaching the internal surface of the wall of the bottle is concerned. Counter-rotational obliquely extending air-liquid discharge outlets or jet holes having the effect just described may be provided in the nozzle wall in the number and at the locations on the nozzle deemed appropriate for the overall chilling action on the internal surface of the glass bottle and the avoidance of angular velocity in liquid draining from any portion of that surface. Non-radial, obliquely directed jets of air applied to the inner surface of the shouldered portion of the bottle as hereinbefore described may be used to supplement and cooperate with such counter-rotational air-liquid jets for optimum results under widely varying service conditions. Good results, at least for some shapes of shouldered glassware, may be obtained by either suitably distributed counter-rotational air-liquid jets alone or by the non-radial jets of air suitably applied without the counter-rotational feature of the air-liquid jets being present.

The illustrated and described embodiments of the invention may be varied and modified in ways which will now be obvious to those skilled in the art and I, therefore, do not wish to be limited to the details of such embodiments.

I claim:

1. In glassware tempering apparatus, a nozzle adapted to be inserted in a shouldered hollow glass article, and means to support said article in an inverted position and said nozzle in inserted position in the inverted article and to rotate the nozzle in one direction about its axis relative to the article, said nozzle being formed with a non-radial fluid discharge outlet extending through its outer wall in a laterally oblique direction counter to the direction of rotation of the nozzle and at a level to discharge fluid onto the inner surface of the shouldered portion of the inverted glass article and with other fluid discharge outlets spaced longitudinally of the nozzle from said first outlet so as to be positioned at a higher level in said inverted article.

2. In glassware tempering apparatus, a nozzle adapted to be inserted in a shouldered hollow glass article, and means to support said article in an inverted position and said nozzle in inserted position in the inverted article and to rotate the nozzle in one direction about its axis relative to the article, said nozzle being formed with a non-radial fluid discharge outlet extending through its outer wall in a laterally oblique direction counter to the direction of rotation of the nozzle and at a level to discharge fluid onto the inner surface of the shouldered portion of the inverted glass article and with other fluid discharge outlets spaced longitudinally of the nozzle from said first outlet so as to be positioned at a higher level in said inverted article, said other fluid discharge outlets also being non-radial and each being formed to extend through the nozzle wall in a laterally oblique direction counter to the rotation of the nozzle.

3. In glassware tempering apparatus, a nozzle adapted to be inserted in a shouldered hollow glass article, and means to support said article in an inverted position and said nozzle in inserted position in the inverted article and to rotate the nozzle in one direction about its axis relative to the article, said nozzle being formed with an internal supply passage for a cooling fluid having a liquid component, said passage extending in the nozzle to the tip portion thereof and the nozzle having distributed jet holes in its wall to discharge jets of said cooling fluid onto the inner surface of the wall of the inverted glass article above the shouldered portion thereof, said nozzle also having an internal passage for air under pressure extending therein approximately to the level of the shouldered portion of the article and with non-radial laterally oblique jet holds extending through its wall to discharge jets of air from said second named internal passage onto the internal surface of the shouldered portion of the article in a direction counter to the direction of rotation of the nozzle.

4. Apparatus as defined by claim 3 wherein said first named jet holes also are non-radial and laterally oblique so as to discharge jets from the nozzle in a direction counter to the rotation of the nozzle.

GEORGE D. MYLCHREEST.

REFERENCES CITED

The following references are of record in the file of this patent:

UNITED STATES PATENTS

| Number | Name | Date |
| --- | --- | --- |
| 1,396,092 | Binns | Nov. 8, 1921 |
| 1,701,066 | Elkington | Feb. 5, 1929 |
| 2,269,060 | Mitford | Jan. 6, 1942 |
| 2,375,944 | Quentin | May 15, 1945 |

FOREIGN PATENTS

| Number | Country | Date |
| --- | --- | --- |
| 450,464 | Great Britain | July 17, 1936 |